United States Patent [19]
Curran

[11] 3,720,227
[45] March 13, 1973

[54] VALVE BONNET COOLING SYSTEM
[75] Inventor: John R. Curran, Attleboro, Mass.
[73] Assignee: The Foxboro Company, Forboro, Mass.
[22] Filed: Jan. 24, 1972
[21] Appl. No.: 220,272

Related U.S. Application Data
[63] Continuation of Ser. No. 42,426, June 1, 1970, Pat. No. 3,648,718.

[52] U.S. Cl..................................137/339, 137/338
[51] Int. Cl..............................................F16k 49/00
[58] Field of Search........................137/337, 338, 339

[56] References Cited

UNITED STATES PATENTS

| | | | |
|---|---|---|---|
| 1,788,000 | 1/1931 | Sparks | 137/338 |
| 1,830,927 | 11/1931 | Campbell et al. | 137/338 |
| 2,114,961 | 4/1938 | Gille | 137/339 |
| 2,254,472 | 9/1941 | Dahl | 137/334 |
| 2,264,306 | 12/1941 | Grove | 137/338 |
| 2,718,898 | 9/1955 | Cotton | 137/339 |
| 2,830,785 | 4/1958 | Buri | 137/340 X |
| 2,851,050 | 9/1958 | Cissell et al. | 137/339 X |
| 2,981,278 | 4/1961 | Bergson | 137/340 |
| 3,253,611 | 5/1966 | Cummins | 137/339 X |
| 3,469,598 | 9/1969 | Wigley | 137/334 |

Primary Examiner—Samuel Scott
Attorney—Lawrence H. Poeton

[57] ABSTRACT

A valve bonnet cooling system for protecting valve stem packing therein and actuating equipment mounted on the bonnet from damage or excessive wear caused by heat transfer along and around the stem and bonnet when the valve is used to control high temperature high pressure fluids such as superheated steam.

19 Claims, 3 Drawing Figures

VALVE BONNET COOLING SYSTEM

CROSS REFERENCE TO RELATED APPLICATION

This is a continuation of application Ser. No. 42,426 filed June 1, 1970 now U.S. Pat. No. 3,648,718.

BACKGROUND OF THE INVENTION

1. Field of the Invention

This invention relates to improvements in valves used in industrial processes and has particular reference to valves used to control high temperature, high pressure fluids such as super-heated steam. Specifically, this invention relates to structures utilized in such valves to prevent or control damage to the valve packing and valve superstructure due to heat transfer from the process fluid and vapors.

2. Description of the Prior Art

Process control valves utilized for regulating steam have been notoriously troublesome. One problem inherent with steam valves is the transfer of intense heat to the bonnet assemblies, thus limiting the types of actuators and other equipment that can be usefully attached to the bonnets.

By far the most troublesome problem, however, has been the heat damage to the valve stem packing. Standard control valve packing is typically capable of withstanding temperatures up to 450°F. The conventional approach to this problem has been to insert an additional bonnet cavity between the valve body and the packing to allow the steam to cool somewhat before reaching the packing. However, the steam tends to circulate about the valve stem, and in a typical control valve situation of this nature, an undesirable amount of maintenance of the valve is required. This takes the form of replacement of the valve stem packing too often, usually every few weeks. Associated structures must be replaced also, too often.

Another approach has been to utilize high temperature resistant valve stem packing capable of withstanding temperatures up to 1,000°F. This approach is at present relatively impractical because of the high cost of the material. It does reduce maintenance cost by increasing the operating life of the packing but does not prevent the bonnet and actuator assemblies from becoming much too hot. This limits the types of actuators that may be utilized and also presents a great hazard to plant personnel that might contact the valve topworks.

Many alternate configurations have been tried unsuccessfully to reduce this maintenance problem. One approach has been to simply mount the valve upside down, that is, with the bonnet and the stem assembly below the valve body and, therefore, below the process fluid.

This upside-down approach is in recognition of the fact that the condensate is at a lower temperature than the steam. This approach is, however, impractical in actual process control applications because it is not workable with existing installations without substantial refitting. It is difficult and awkward to repair valves in that position.

SUMMARY OF THE INVENTION

In order to correct the difficulties enumerated above, this invention provides a valve with a cooling chamber structure at least on a level with and usually below the conventional valve stem packing assembly, allowing the process fluid steam to leak along the valve stem into the cooling chamber in a condensing action within such chamber. A close fitting cylinder is provided, surrounding the stem from the valve body toward the valve stem packing, and this cylinder terminates in the open area steam expansion condensing chamber. A special baffle structure may be contained between the outside of this cylinder and and the inner walls of the bonnet structure in an opening essentially dead-ended at the bottom. This baffle structure may be constructed of a porous material impervious to the high temperature steam, such as stainless steel wool.

The steam travels between the stem and cylinder in a direction away from the higher temperature of the process fluid and the valve body. As it travels, it cools and condenses, especially as it enters the condensing chamber and then drops down on the many surfaces of the baffle structure. The condensate collects in the condensing chamber and essentially fills it. Heat transfer from the condensate to the metal structure of the valve is less than that from the steam, thereby cooling the bonnet assemblies. As the condensate fills the cooling chamber, it is trapped and eventually tries to flow back along the valve stem inside the cylinder. This downward transfer of condensate further cools and restricts the flow of steam moving in the opposite direction. Also steam is trapped and pressurized in the lower part of the bonnet outside the cylinder. In a short time a balance is reached which provides a maximum of valve bonnet, topworks and packing cooling.

This cooling in a chamber between the valve stem packing and the valve body allows conventional packing to be used above or beyond the cooling chamber. A separate cooling unit may be used. For example, a conventional valve assembly may be retrofitted for steam by increasing the stem length and inserting a cooling unit containing a condensate system as above, in a separate unit between a conventional valve body and a conventional bonnet. Alternately an elongated valve bonnet may be provided containing the condensate system as an integral part.

A valve structure utilizing this invention may be mounted upright with the bonnet vertically above the valve body, or horizontally, with the valve bonnet at the same height as the body. This condensate system structure may be beneficially fitted with metal fins integral with or in contact with the outer walls of the condensate system housing to increase cooling by ambient air flow.

It is, therefore, an object of the instant invention to provide an improved valve structure for use in controlling high temperature fluid flow. It is a further object of this invention to provide a structure maximizing the operating life of the valve stem packing in such operations. It is a further object of this invention to maximize heat transfer transversely out of the valve stem area by means of external air cooling and by transverse high heat conductive devices, thereby cooling the bonnet assembly and preventing excessive damage and wear. It is a primary object to provide steam expansion and condensing structure that entraps the condensate and creates a vapor liquid inversion, thereby greatly reducing bonnet temperature.

DESCRIPTION OF THE PREFERRED EMBODIMENT

Figure 1:
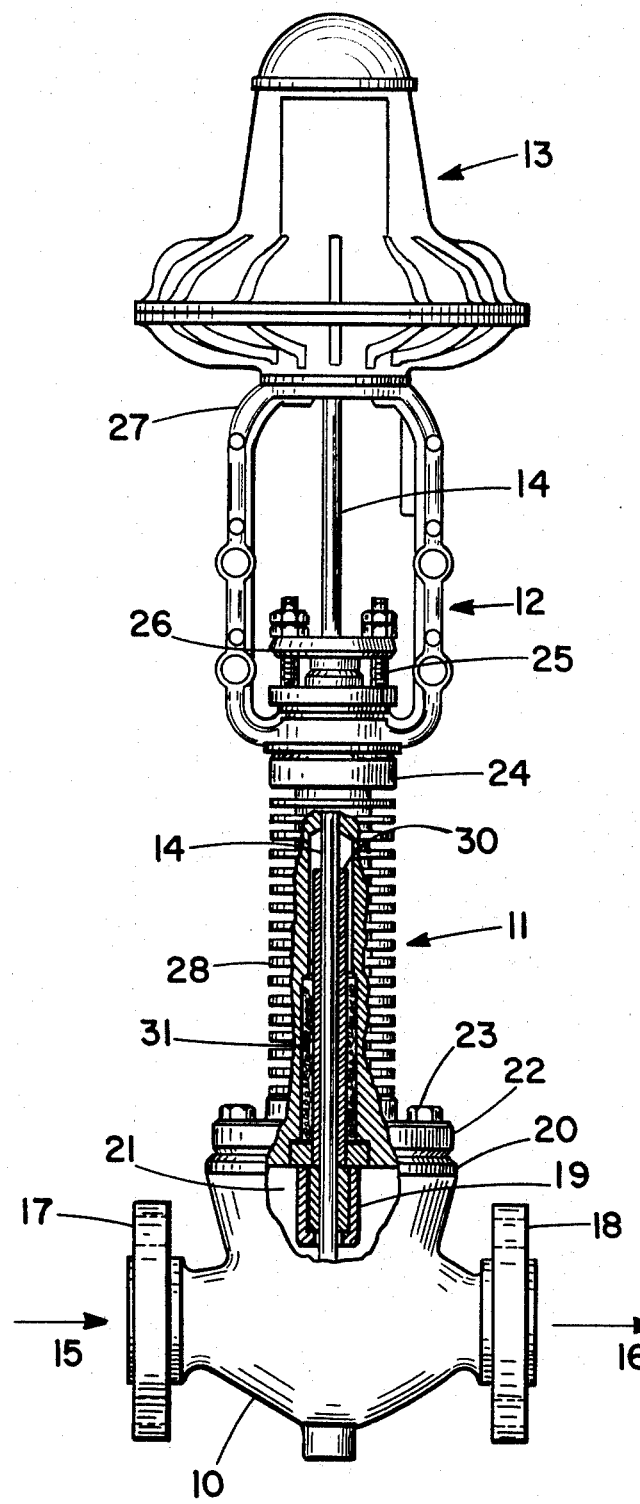
FIG. 1 is an elevation of a valve assembly according to this invention, with a partial vertical central cutaway to illustrate a cooling chamber constructed as part of the valve bonnet.

The overall structure of FIG. 1 comprises a valve body 10, a valve bonnet 11, a yoke 12, a valve motor 13 and a valve stem 14 with associated internal structure.

The interior of the valve body 10 is provided with a suitable valving aperture (not shown) with a suitable valve plug (not shown) on the lower end of the valve stem for varying such aperture to control fluid flow through the valve from an input 15 to an exit 16. The valve is used in a flow pipe line, with coupling flanges 17 and 18 on the valve body 10 for connection of the valve into such pipe line. The variation of the fluid flow is accomplished by vertical up and down movement of the valve stem 14, as effected by the valve motor 13 in accordance with control signal forces applied to such motor.

In this illustrative embodiment of this invention, the valve body 10 is shown with an internal, central, valve stem guide structure 19.

The valve body 10 has a top portion 20 with an access opening 21 through which the valve stem 14 extends into the valve body from the motor 13 and through the yoke 12 and the bonnet 11.

The bonnet 11 is a sleeve body with a bottom flange 22 which rests on the top of the valve body. It is located around the access opening 21 so that the internal axial opening of the bonnet is aligned with this access opening. Thus a continuous passage axially through the bonnet is provided for the valve stem 14.

The bonnet bottom flange 22 is secured to the valve body by bolts 23. The top of the bonnet 11 is provided with a flange 24 on which the bottom of the yoke 12 is mounted by a coupling structure 25 which also secures a valve stem packing gland flange 26.

The yoke 12 is an open frame structure with its top 27 secured to the bottom of the valve motor 13. Suitable diaphragm and spring structure is provided within the valve motor to operate the valve stem 14 in response to pressure change in the motor 13.

Figure 2:
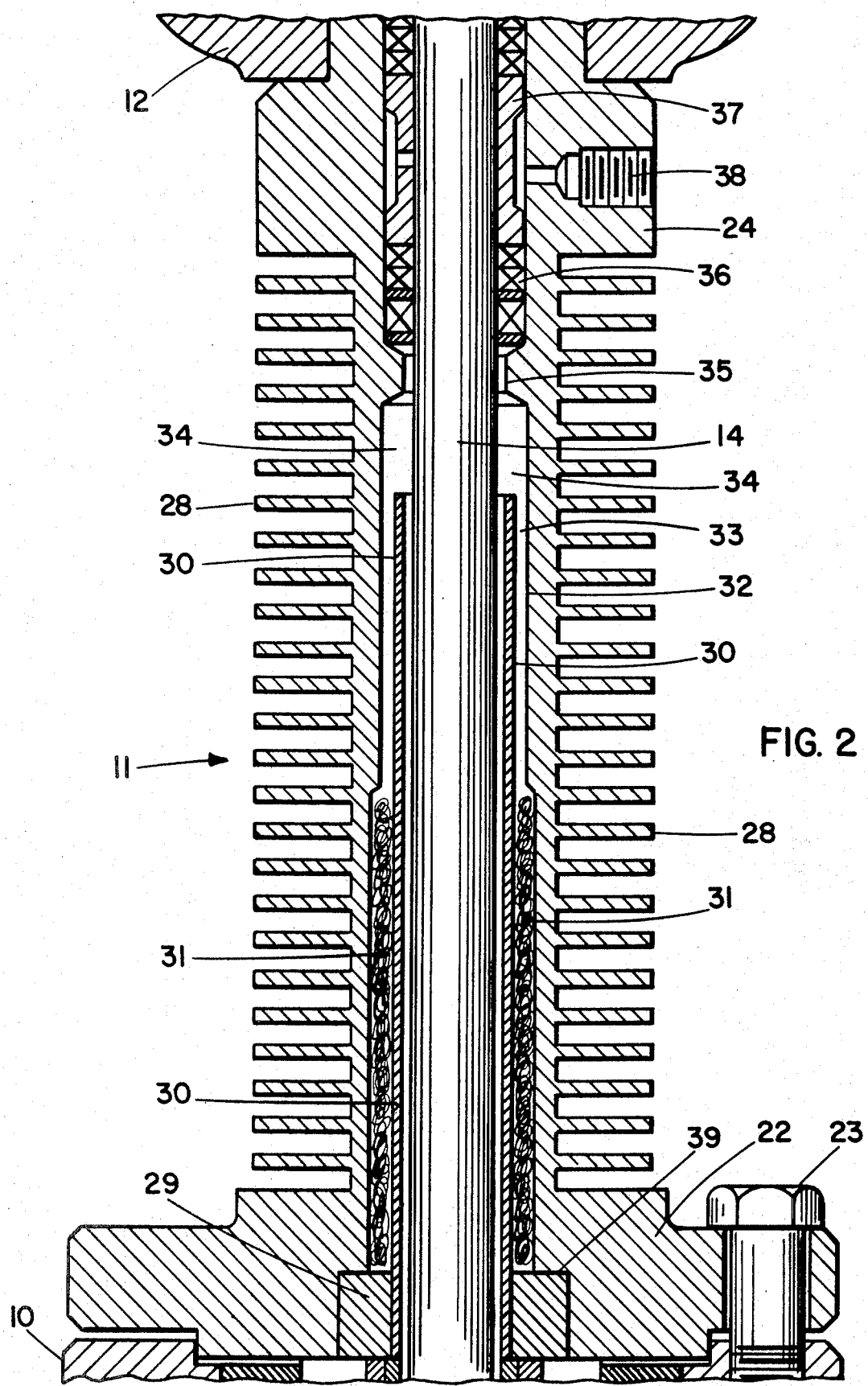
FIG. 2 is a vertical central section in an expanded view of the cooling portion of FIG. 1, showing the steam packing and tube in greater detail.

As seen also in FIG. 2, the external form of the bonnet 11 is generally cylindrical. The outside wall has a full complement of circular heat sink fins 28, all horizontally disposed, parallel and evenly spaced with respect to each other. This structure forms an external heat sink pattern along the full length of the bonnet 11, between the top and bottom bonnet coupling flanges 24 and 22.

Internally, the central axial opening up through the bonnet is cylindrical, with a series of different diameters. At the bottom of the bonnet, within the flange 22, the largest of these diameters contains a base ring 29 whose bottom face is flush with the bottom of the bonnet flange 22. In a tight fit within the base ring 29 is the bottom of a cylindrical channel sleeve 30 which extends upwardly along and about the valve stem 14 to a point in the upper portion of the bonnet. The sleeve 30 is concentric with the valve stem 14 and spaced therefrom to provide a narrow ring open channel up through the bonnet between the sleeve 30 and the stem 14.

From the base ring 29, upwards, the next interior diameter of the bonnet is smaller. It provides a sleeve form space between the sleeve 30 and the inner wall of the bonnet and dead ended at the bottom. This space extends from the base ring 29 to a vertically intermediate point in the bonnet interior. This space provides a significant radial dimension between the sleeve 30 and the inner wall of the bonnet, and contains a sleeve-form body 31 of fibrous filter-like material such as steel wool.

From the top of the steel wool body to a point well above the top end of the sleeve 30, but below the top flange 24 of the bonnet, a third, still smaller diameter 32 of the interior of the bonnet is provided. This diameter 32 provides a narrow open sleeve space 33 between the channel sleeve 30 and the inner wall of the bonnet throughout the upper extent of the channel sleeve 30. The diameter 32 further provides a wide ring open chamber form 34 above the top end of the channel sleeve 30.

Above the chamber 34, the interior of the bonnet narrows to a diameter 35 roughly that of the channel sleeve 30 to provide a support base for a suitable valve stem packing ring column 36 in an again expanded diameter of the interior of the bonnet. This column extends to the top of the bonnet in the usual manner, and may contain a lantern ring 37 with a associated lubrication opening 38 through the wall of the bonnet.

The purpose of this overall structure relates to the control of high temperature fluids, such as superheated steam. In the passage of steam through the valve, inevitably, in any practical structure, there will be steam leakage up into the valve bonnet. In order to extend the useful life of the usual forms of valve stem packing, motors, and associated structures, it is important to protect such packing from the high temperatures of such steam leakage.

This invention accomplishes this purpose by providing special steam condensing structure between the valve stem packing and the valve body. The result is a stable body of reduced temperature liquid condensate just below the valve stem packing, a body of steam just below the body of condensate, and dead end chamber means to inhibit circulation of steam within the valve bonnet by creating and maintaining such inversion of liquid above and steam below.

In the structure of FIGS. 1 and 2, it will be seen that the bottom of the channel sleeve 30 rests on, or lies adjacent to, any suitable portion of the valve body 10. The steam from the valve body leaks mainly up into the channel sleeve 30, directly about and in contact with the valve stem 14. Steam is generated from the condensate in the bottom of the steel wool sleeve 31 by conduction from the valve body.

As the steam reaches the open chamber 34 it tends to condense by expansion and in part due to the heat sink effect of the outer fins 28. This condensate liquid tends to buffer further steam coming up the inside of the channel sleeve 30. It also trickles down into the steel wool 31 and an interface is formed with the steam in the steel wool generated therein because the condensate tends to again become steam as it reaches the hotter lower portion of the bonnet.

The result is an inversion with a cooler liquid body above and hot steam below, with steam circulation inhibited because there is essentially a dead end 39 at the bottom of the body of steel wool, and because of the retarding effect of the steel wool.

Accordingly, although the valve stem and body are in direct contact with steam in its lower portion, their upper portion passes through contact with the cooler body of condensate in the chamber 34. Thus the transfer of heat from the steam to the packing column and upper structure is indirect, through the condensate and reduced in its travel upward along the valve stem and along the valve body.

The steel wool 31, or other packing material, has a function of heat transfer from the outer wall of the sleeve 30 to the inner wall of the valve bonnet, in aid of the overall cooling function.

An important feature of this invention is the inhibition of circulation within the bonnet. This situation, as structured by the essentially dead ending of the bottom of the space between the sleeve 30 and the interior wall of the bonnet, enables trapping of condensate in the upper portion of the interior of the bonnet, creating a useful temperature inversion and inhibiting circulation within the bonnet.

The bonnet 11 of FIGS. 1 and 2 is show as a single unit including both the heat protection structure of this invention and the usual valve stem packing column 36.

Figure 3:
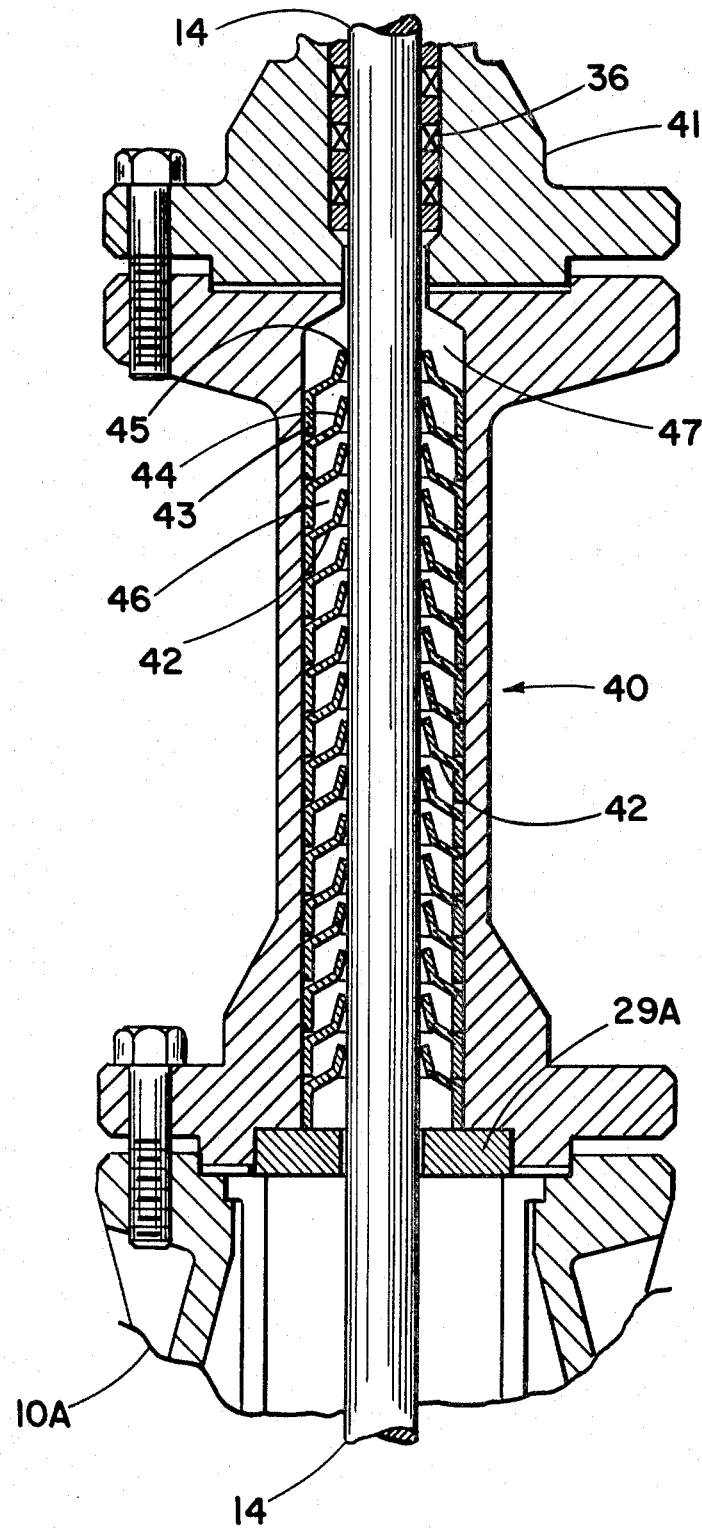
FIG. 3 is a vertical central section of a portion of a valve assembly according to this invention, utilizing a separate cooling unit and showing an alternate form of construction.

As an alternate structure there can be two bodies, as shown in FIG. 3. The heat protection structure can be in a lower bonnet form 40 and the usual bonnet 41 with the packing column 36 may be mounted on top of the bonnet form 40. This allows for retrofitting a previous structure for new use with steam flow, simply by removing the old bonnet and inserting the lower bonnet form with the old bonnet on top. The necessary change to a longer valve stem is a simple matter.

Accordingly, an alternate form of this invention is the use of the heat protection structure of FIGS. 1 and 2 in a separate, lower bonnet form according to the general showing of FIG. 3.

Other alternate forms of this invention include the use of FIG. 3 baffle system in a unitary bonnet and, as shown in FIG. 3 in that the different heat protection structure of FIG. 3 is embodied in a separate lower bonnet form 40, with a standard bonnet 41 on top thereof.

It is thus part of the concept of this invention that the different heat protection structure in the lower bonnet form 40 of FIG. 3 may be used in the unitary, single bonnet structure of FIGS. 1 and 2, instead of the heat protection structure shown in the bonnet 11 of FIGS. 1 and 2.

The FIG. 3 structure comprises the lower bonnet form 40 mounted on a valve body 10A, with a standard form of bonnet 41 mounted on top of the lower bonnet.

In FIG. 3, the bonnet form 40 has a central axial valve stem opening therethrough. At its lower end, this opening has an enlarged diameter with a base ring 29A therein. This opening, otherwise, has a single diameter extending to the top of the bonnet form 40. At this point it narrows to match the narrow bottom entrance to the top bonnet, which narrow entrance provides a support base for the valve stem packing ring column 36.

The FIG. 3 heat protection structure comprises a column of ring baffles 42, around and along the valve stem 14. Each of the baffles 42 comprises a base ring 43 with a conical top 44 open at the top to receive the valve stem 14, with a small clearance 45 adjacent the stem. The base ring of each baffle nests over the conical top of the baffle next below it. If desired, spacers between adjacent baffles may be used to vary the location and degree of baffle effect in the column of baffles. Such spacers may comprise only the base ring of one or more of the baffles.

The baffle clearances 45 provide a thin sleeve passage for steam to follow up the valve stem. Condensation and baffle trapping of the resultant liquid occurs in the individual dead bottom end chambers 46 that the baffle column provides. Circulation is inhibited and inversion occurs, with a liquid body in the chamber 47 above the baffles and in some of the baffles. Each baffle thus provides a dead end chamber not unlike in effect the dead end chamber of FIG. 2 and may contain steel wool if desired. Thus many possibilities are available of varied contour, size and configuration of dead end or restricted chambers for inhibiting circulation and reacting liquid-steam inversions. Each such structure will aid in heat transfer from the valve stem or near it, to the inner wall of the bonnet form.

This invention, therefore, deals with the problem that most valve stem packing, valve motors, and associated structure are not suitable for high temperature application, such as the flow control of super-heated steam. Difficulties occur because process fluids circulate about the valve stem and in the bonnet, adding heat faster than it is dissipated.

This invention provides baffle structure, for example, baffle rings or metal wool, which is heat conductive. This structure extends across the area from adjacent the valve stem to the inner wall of the bonnet, in or forming one or more dead end pockets. Thus vapor or steam condenses at the top, into an essentially non-circulating and low heat-conducting body of liquid supported from below by trapped steam. Thus, the bonnet is kept protectively relatively cool and also is safer for handling.

As many embodiments may be made of the above invention, and as changes may be made in the embodiments set forth above without departing from the scope of the invention, it is to be understood that all matter hereinbefore set forth and in the accompanying drawings is to be interpreted as illustrative only and not in a limiting sense.

What is claimed is:

1. An improved valve structure for controlling the flow of high temperature fluids at least in part in vapor form of the type having;
   a valve body,
   a valve bonnet on said body,
   a valve stem extending through the valve bonnet to the valve body, and valve stem packing in the valve bonnet disposed about the stem, wherein the improvement comprises:

a narrow passage in said bonnet along and about said valve stem;

a dead end pocket structure beside said narrow passage and separated therefrom; and a condensing chamber open to both said passage and said pocket, said condensing chamber being located between said valve stem packing and one end of said passage.

2. A valve structure according to claim 1, wherein:

said dead-end pocket structure includes a series of pockets along said valve stem.

3. A valve structure according to claim 1, wherein:

said dead-end pocket structure includes a single pocket extending a significant distance along said valve stem.

4. A valve structure according to claim 1, wherein:

said dead-end pocket structure includes a single pocket extending a significant distance along said valve stem, and a filter-like body of fibrous material in said single pocket.

5. A valve structure according to claim 1, wherein:

a filter-like body of fibrous material is contained in said dead-end pocket.

6. A valve structure according to claim 1, wherein:

a body of steel wool is contained in said dead end pocket.

7. A valve structure according to claim 1, wherein:

said dead-end pocket structure includes a single pocket extending a significant distance along said valve stem, and a body of steel wool in said single pocket.

8. A valve structure according to claim 1, wherein:

a sleeve member is mounted about and along said valve stem to essentially define said narrow passage and said dead-end pocket.

9. A valve structure according to claim 1, wherein:

A stacked column of ring baffles is mounted about and along said valve stem to essentially define said narrow passage and said dead end pocket structure.

10. A valve structure according to claim 1, wherein:

a body of heat conductive filter-like material is located in said pocket structure, with one of its functions embodied in heat transfer transversely from the area of the valve stem to the inner wall of said inversion structure.

11. A valve structure according to claim 1, wherein:

said pocket structure is formed by a stacked column of ring baffles, with one of the functions of said baffles embodied in heat transfer transversely from the area of the valve stem to the inner wall of said inversion structure.

12. In a high temperature flow control valve, the improvement comprising:

an expansion chamber about the stem of said valve for receiving and condensing steam flow along such valve stem; and a dead end chamber open to said expansion chamber and located between said expansion chamber and the body of the valve, for trapping condensate from said chamber and preventing circulation of steam along such valve stem.

13. A valve bonnet cooling unit comprising:

an outer sleeve for containing a valve stem; and an inner sleeve, contained by said outer sleeve and also for containing such valve stem;

said inner sleeve extending from a point adjacent the valve body end of said outer sleeve to a point significantly short of the other end of said outer sleeve.

14. A cooling unit according to claim 13, wherein:

said inner sleeve is defined by the inner peripheries of a stacked column of ring baffles.

15. A cooling unit according to claim 13, wherein:

said cooling unit is integral with a valve bonnet.

16. A cooling unit according to claim 13, wherein:

said cooling unit is a separate body, mounted between a valve body and a valve bonnet.

17. In a valve assembly for use in hot fluid applications including means for inhibiting hot fluid circulation along the valve stem, the improvement comprising:

a sleeve member within said assembly containing a partial length of such valve stem to form an elongate narrow sleeve channel along such partial length, and means disposed about said sleeve member for trapping a body of condensate located beyond said partial length of such valve stem.

18. In bonnet structure for use in a valve for controlling the flow of super heated steam, the improvement comprising:

an elongate housing structure having an axial opening therethrough for centrally containing part of the length of a valve stem;

a narrowed portion in said opening forming a radially inward extending abutment;

a column of valve stem packing disposed in said opening with said abutment as a base;

an inner sleeve, concentrically disposed in said opening on the opposite side of said abutment from said packing and extending from that end of said housing structure to a point significantly short of said abutment;

a base ring mounted about said inner sleeve at said end of said housing structure and forming a dead end for a portion of said axial opening which is radially outward from said inner sleeve; and a body of steel wool in said dead ended portion of said axial opening;

whereby a narrow flow passage is provided within said sleeve along a valve stem in said axial opening into a condensing chamber between the inner end of said sleeve and said abutment, said dead ended portion of said axial opening being open to said condensing chamber.

19. In a bonnet structure for use in a valve for controlling the flow of super heated steam, the improvement comprising:

an elongate housing structure having an axial opening therethrough for centrally containing part of the length of a valve stem;

a narrowed portion in said opening forming a radially inward extending abutment;

a column of valve stem packing disposed in said opening with said abutment as a base;

a base ring mounted at the end of said housing structure on the opposite side of said abutment from said packing; and a column of rings baffles based on said base ring and extending to a point significantly short of said abutment, each of said baffles comprising an outer sleeve bottom ring and an inwardly conical open top extending toward said abutment wherein the bottom ring of each such baffle nests over the conical top of the next adjacent baffle;

whereby a narrow flow passage is essentially defined by said open tops of said baffles and a valve stem when contained in said axial opening, a condensing chamber is formed between the inner end of said column of baffles and said abutment and is open to said flow passage, and dead end pockets are formed between each adjacent pair of said ring baffles.

* * * * *